(12) United States Patent
Seo et al.

(10) Patent No.: US 11,418,735 B2
(45) Date of Patent: Aug. 16, 2022

(54) IMAGE PROCESSING DEVICE INCLUDING VISION SENSOR AND OPERATING METHOD THEREOF

(71) Applicant: Samsung Electronics Co., Ltd., Suwon-si (KR)

(72) Inventors: Jong-Seok Seo, Seoul (KR); Jeong Seok Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/332,377

(22) Filed: May 27, 2021

(65) Prior Publication Data

US 2022/0094865 A1    Mar. 24, 2022

(30) Foreign Application Priority Data

Sep. 21, 2020    (KR) .................. 10-2020-0121581

(51) Int. Cl.
*H04N 5/357*    (2011.01)
*H04N 5/351*    (2011.01)

(52) U.S. Cl.
CPC .......... *H04N 5/3572* (2013.01); *H04N 5/351* (2013.01)

(58) Field of Classification Search
CPC .... H04N 5/3572; H04N 5/351; H04N 5/3454; H04N 5/3456
USPC ........................................ 348/251
See application file for complete search history.

(56) References Cited

U.S. PATENT DOCUMENTS

| | | | |
|---|---|---|---|
| 10,436,884 B2 | 10/2019 | Wu et al. | |
| 10,447,920 B2 | 10/2019 | Horesh | |
| 10,567,679 B2 | 2/2020 | Berner et al. | |
| 2017/0140509 A1* | 5/2017 | Lee | H04N 5/23248 |
| 2018/0060675 A1 | 3/2018 | Ji et al. | |
| 2018/0262705 A1* | 9/2018 | Park | G06F 16/2322 |

FOREIGN PATENT DOCUMENTS

| | | | |
|---|---|---|---|
| JP | 4682990 B2 | 5/2011 | |
| JP | 5240703 B2 | 7/2013 | |
| KR | 10-2020-0029270 A | 3/2020 | |

* cited by examiner

*Primary Examiner* — Lin Ye
*Assistant Examiner* — Chan T Nguyen
(74) *Attorney, Agent, or Firm* — Harness, Dickey & Pierce, P.L.C.

(57) ABSTRACT

An image processing device is provided. The image processing device includes a vision sensor including a plurality of pixels, each pixel configured to generate a plurality of events per frame by sensing a change in intensity of light and configured to generate a plurality of timestamps indicating event occurrence times of the plurality of events, and a processor configured to correct an event data packet based on a response time and to output the event data packet based on the response time, the response time determined by a position of the pixel and an illuminance value.

20 Claims, 8 Drawing Sheets

Frame 1
(a)

Frame 1
(b)

Frame 1  Frame Nth  Frame Mth

IMAGE PROCESSING DEVICE INCLUDING VISION SENSOR AND OPERATING METHOD THEREOF

CROSS-REFERENCE TO RELATED APPLICATION

This application claims priority from Korean Patent Application No. 10-2020-0121581 filed on Sep. 21, 2020 in the Korean Intellectual Property Office, and all the benefits accruing therefrom under 35 U.S.C. § 119, the contents of which in its entirety are herein incorporated by reference.

BACKGROUND

Some example embodiments relate to an image processing device including a vision sensor.

In general, an image sensor may be broadly classified into an image sensor that operates synchronously and an image sensor that operates asynchronously. A complementary metal-oxide semiconductor (CMOS) image sensor is a representative example of the image sensor that operates synchronously. A vision sensor such as a dynamic vision sensor (DVS) is a representative example of the image sensor that operates asynchronously.

The dynamic vision sensor (DVS) functions similarly to a human retina, without collecting scenes in frames. For example, the dynamic vision sensor transmits only changes in pixel brightness (e.g., event) at a specific position in a scene at the time of occurrence of an event.

The output of the dynamic vision sensor is or includes a stream of events related to a specific state. For example, the specific state is or corresponds to a binary value indicating whether a brightness of a related event has changed positively or negatively compared to an immediately previous state of a position of an event in a camera array and a related position.

SUMMARY

Aspects of inventive concepts provide a technique for improving performance of an image processing device by improving lens shading of an event that occurs at a low illuminance.

Some example embodiments provide an image processing device including a vision sensor including a plurality of pixels, each of the plurality of pixels configured to generate a plurality of events per frame by sensing a change in intensity of light, and to generate a plurality of timestamps indicating event occurrence times of the plurality of events, and a processor configured to correct an event data packet and to output the event data packet, the correcting and the outputting based on a response time determined by a position of the pixel and determined by an illuminance value.

Some example embodiments provide an image processing device including a pixel array including a plurality of pixels, each of the plurality of pixels configured to sense a change in light intensity and to generate an event performed by a moving object, and processing circuitry configured to output the change in light intensity sensed from the pixel array as an illuminance value, to enable at least one pixel of the pixel array, to receive an event value from the pixel when the event occurs, to issue a timestamp at a preset period, and to correct an event data packet based on a response time determined by an illuminance value and by an address of the pixel where the event occurs.

Some example embodiments of provide an operating method of an image processing device including generating an event in at least one pixel included in a pixel array, the event based on movement of an object, correcting an event occurrence time when the event occurs based on lens shading information corresponding to a pixel position in the pixel array where the event occurs and based on an illuminance value of the event occurrence time, and outputting a plurality of event values as an event data packet, the outputting based on the corrected time.

However, aspects of some example embodiments are not restricted to the one set forth herein. The above and other aspects of example embodiments will become more apparent to one of ordinary skill in the art to which example embodiments pertains by referencing the detailed description of example embodiments given below.

BRIEF DESCRIPTION OF THE DRAWINGS

The above and other aspects and features of example embodiments will become more apparent by describing in detail some example embodiments thereof with reference to the attached drawings, in which.

DETAILED DESCRIPTION OF SOME EXAMPLE EMBODIMENTS

Hereinafter, some example embodiments of some example embodiments will be described with reference to the accompanying drawings.

Figure 1:
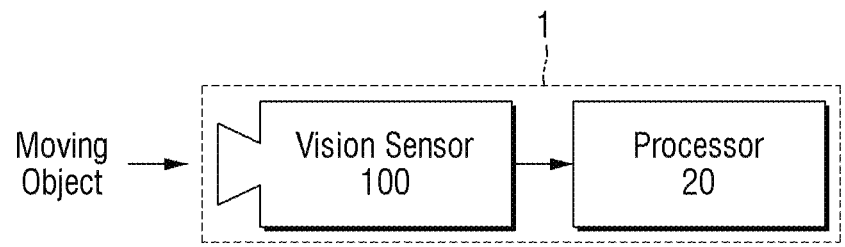
FIG. 1 is a block diagram illustrating an image processing device according to some example embodiments.

FIG. 1 is a block diagram illustrating an image processing device according to some example embodiments.

An image processing device 1 may be configured to process a synchronous event and/or an asynchronous event. For example, the image processing device 1 may generate synchronous frames related to an event as well or alternatively to an asynchronous packet related to the event. The image processing device 1 may include a vision sensor 100 and a processor 20.

The vision sensor 100 may detect a change in intensity of incident light and may output an event signal. For example, when an event occurs in which a light intensity increases, the vision sensor 100 may output an on-event corresponding thereto. Alternatively, when an event occurs in which a light intensity decreases, the vision sensor 100 may output an off-event.

The vision sensor 100 may be or include an event-based vision sensor. For example, the vision sensor 100 may access a pixel where the change in light intensity is detected and output an event signal. For example, the change in light intensity may be caused by movement of an object imaged by the vision sensor 100 or movement of the vision sensor 100 itself. Accordingly, the event signal detected by the vision sensor 100 and/or outputted from the vision sensor 100 may be or include an asynchronous event signal.

Alternatively or additionally, the vision sensor 100 may be or include a frame-based vision sensor. For example, the vision sensor 100 may scan all pixels forming the vision sensor 100 at every reference cycle (or period) and output event signals. However, unlike a general CMOS image sensor, the vision sensor 100 may output event signals only for pixels where the light intensity is detected, without outputting event signals for all pixels. In this case, the event signal outputted from the vision sensor 100 may be converted to a synchronous event signal by a processor and/or the like.

The processor 20 may process the signals detected by the vision sensor 100. The processor 20 may include an application specific integrated circuit (ASIC), a field-programmable gate array (FPGA), a dedicated microprocessor, a microprocessor, or the like. Alternatively or additionally, the processor 20 may include a general purpose processor.

The image processing device 1 of some example embodiments may improve performance of the vision sensor 100 when the events received from the pixels simultaneously imaged by the vision sensor 100 have different response times due to lens shading.

Figure 2:
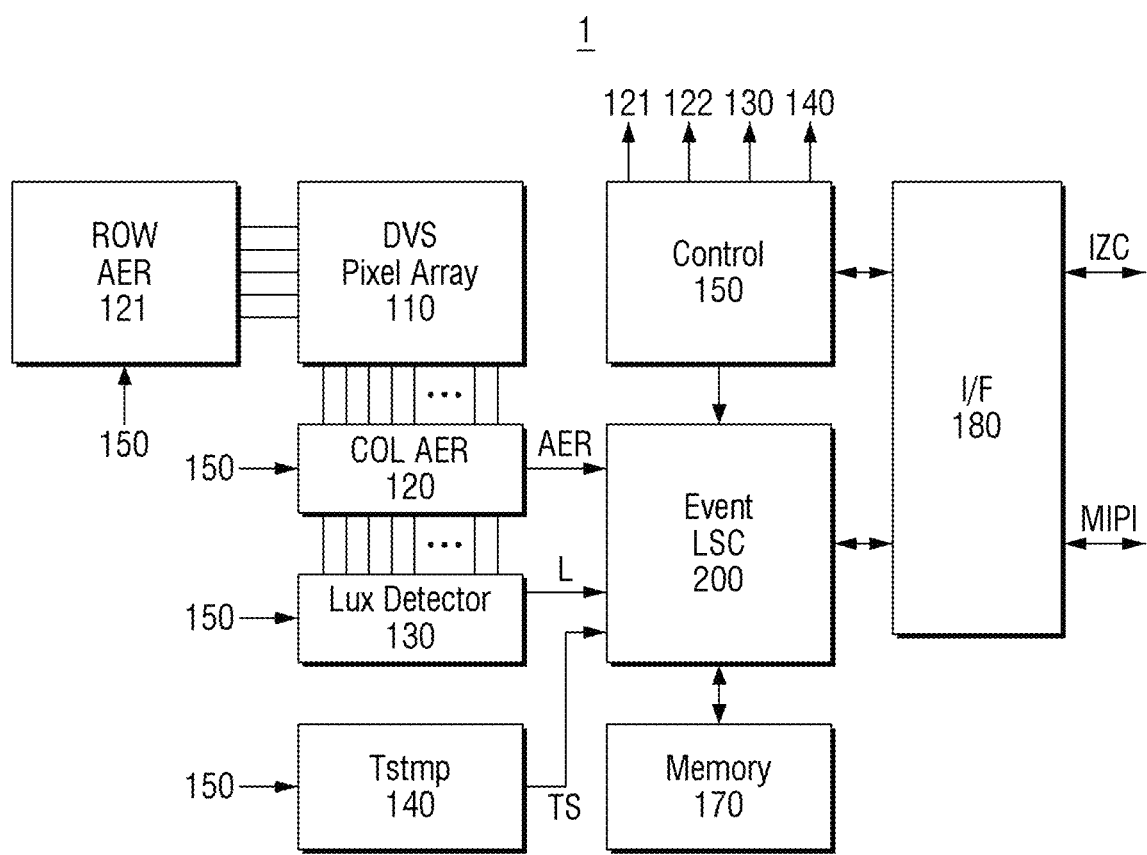
FIG. 2 is a block diagram illustrating an example configuration of the image processing device shown in FIG. 1.

FIG. 2 is a block diagram illustrating an example configuration of the image processing device shown in FIG. 1.

Referring to FIG. 2, the image processing device 1 may include a pixel array 110, a row address event representation (AER) 121, a column AER 122, an illuminance detector 130, a timestamper 140, a controller 150, an event compensation unit 200, a memory 170, and an input/output interface 180.

The row AER 121 enables, e.g. activates, at least one pixel included in the pixel array 110 under the control of the controller 150, and the column AER 122 outputs a sensing value from the enabled pixel. When or in response to an event occurring by movement of an object, the column AER 122 may output an address AER of a pixel where the event occurs to the event compensation unit 200. In some example embodiments, the column AER 122 may receive an event value from the pixel where the event occurs. The event value may be or correspond to an on-event or an off-event depending on changes in light intensity.

The illuminance detector 130 detects and outputs the value indicating the change in light intensity, i.e., an illuminance value L, from the sensing value outputted from the pixel. The illuminance value L may be detected in pixel units and/or in patch units in some example embodiments.

The timestamper 140 may issue a timestamp at a specific (or, alternatively, preset) period. When an event occurs, the timestamper 140 may issue a timestamp at the time of generation of the event value to an event value outputted from each pixel. The event compensation unit 200 may receive a timestamp at the event value generation time and correlate both information in some example embodiments, and/or may receive a timestamp at a time different from an event value generation time and correlate both information later in some example embodiments.

The event compensation unit 200 may correct an event data packet based on the response time determined by the illuminance value L and/or the address of the pixel where the event occurs. Details thereof will be described below with reference to FIG. 7.

The controller 150 may control the operations of the components 121, 122, 130, 140, 170, 180, and 200. Alternatively or additionally, data may be loaded from the memory 170, subjected to a specific (or, alternatively, predetermined) operation, and may be outputted.

The memory 170 may store information related to an event compensation scheme. In some example embodiments, the memory 170 may store lens shading information and a frame.

In some example embodiments, the memory 170 may include a one-time programmable (OTP) memory 171. The lens shading information may be or may include information on a response time that considers at least one of an illuminance value, a pixel position, a patch position, a lens shape, or the like in some example embodiments. In some example embodiments, the response time may include a delay time for an event occurrence timing.

The event compensation unit 200 may load the lens shading information from the OTP 171 and reflect the illuminance value L (Lux Data) received from the illuminance detector 130 as a weight. For example, a response time curve shown in FIG. 7 may be selected based on the illuminance value.

Although the scheme is illustrated such that the illuminance value is reflected to the lens shading information includes a multiplier 251 and a first adder 252 in some example embodiments, inventive concepts are not limited thereto. For example, alternatively or additionally the scheme may be implemented in various embodiments such as a mapping table and/or the like in some example embodiments.

In some example embodiments, the memory 170 may include a delayed event storage 175 that stores a frame. In some example embodiments, the delayed event storage 175 may store an event value of at least one pixel to be delayed in each of a plurality of frames generated from an earliest response time to a latest response time.

The memory 170 may include a plurality of nonvolatile memory devices in some example embodiments, and the nonvolatile memory device may include, e.g., a flash memory, and/or a resistive memory such as a resistive RAM (ReRAM), a phase change RAM (PRAM), and/or the like. The memory 170 may be a buffer memory according to some example embodiments. According to some example embodiments, the memory 170 may include at least one of a cache, a read only memory (ROM), a programmable read only memory (PROM), an erasable prom (EPROM), an electrically erasable programmable read-only memory (EPEPROM), a phase-change RAM (PRAM), a flash memory, a static RAM (SRAM), or a dynamic RAM (DRAM).

The input/output interface 180 may be connected to an external device by an I2C method while being connected to the controller 150, or may be connected to the external device by a MIPI method while being connected to the event compensation unit 200. Although not illustrated, the input/output interface 180 may generate and output a packet including an event value, a pixel address, and a timestamp in some example embodiments.

In the image processing device 1, in some example embodiments, the vision sensor 100 may include the pixel array 110, the row AER 121, the column AER 122, the illuminance detector 130, the timestamper 140, and the controller 150, and the processor 20 may include the event compensation unit 200 and the memory 170. Alternatively or additionally, in the image processing device 1, in some example embodiments, the vision sensor 100 may include the pixel array 110, the row AER 121, the column AER 122, the illuminance detector 130, the timestamper 140, the controller 150, the memory 170, and the event compensation unit 200.

Figure 3:
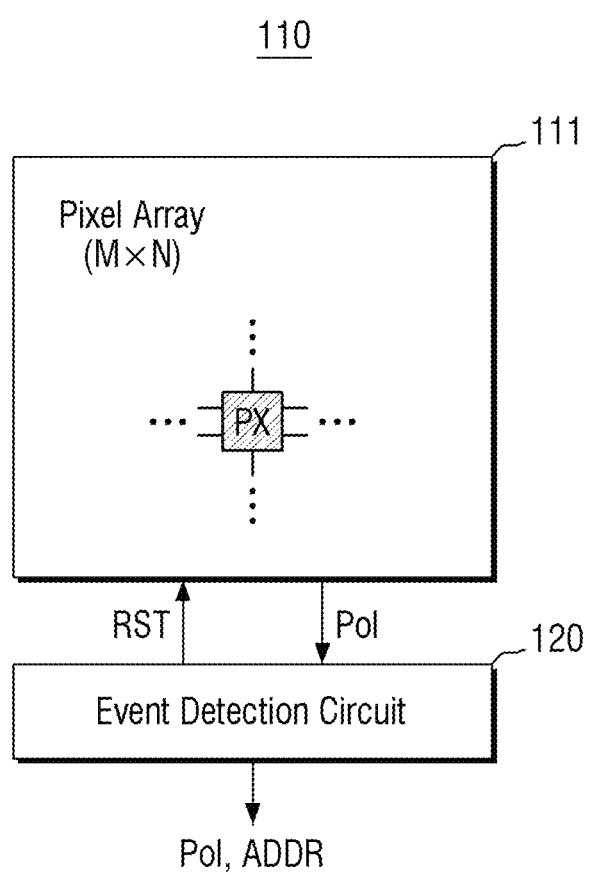
FIG. 3 is a block diagram illustrating an example configuration of a vision sensor illustrated in FIG. 1.
Figure 4:
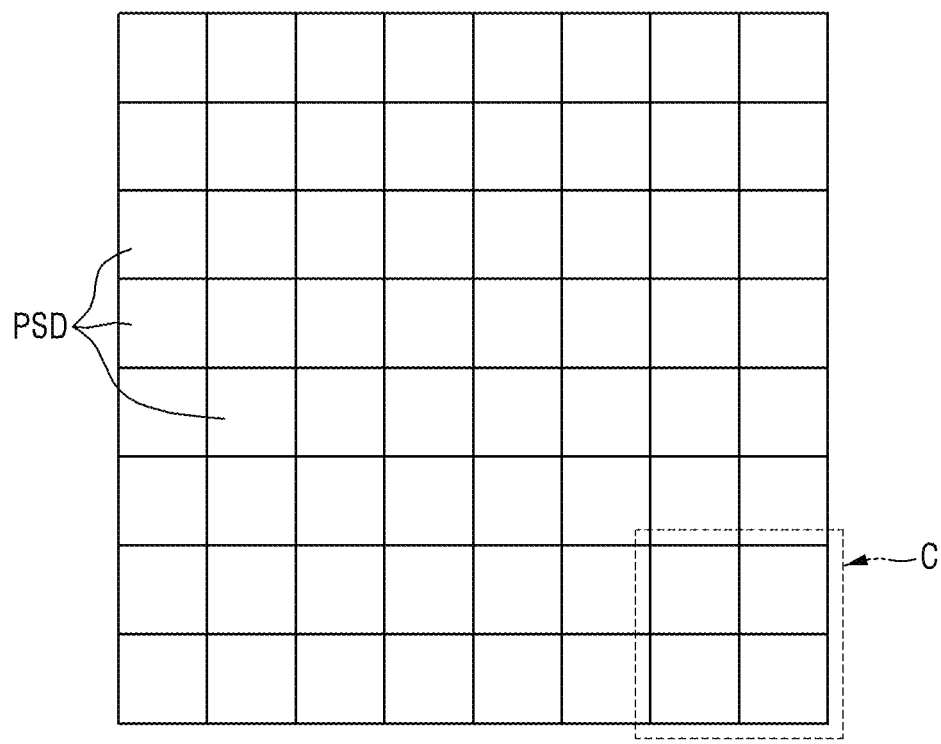
FIG. 4 is a block diagram illustrating an example configuration of a pixel array illustrated in FIG. 2.
Figure 5:
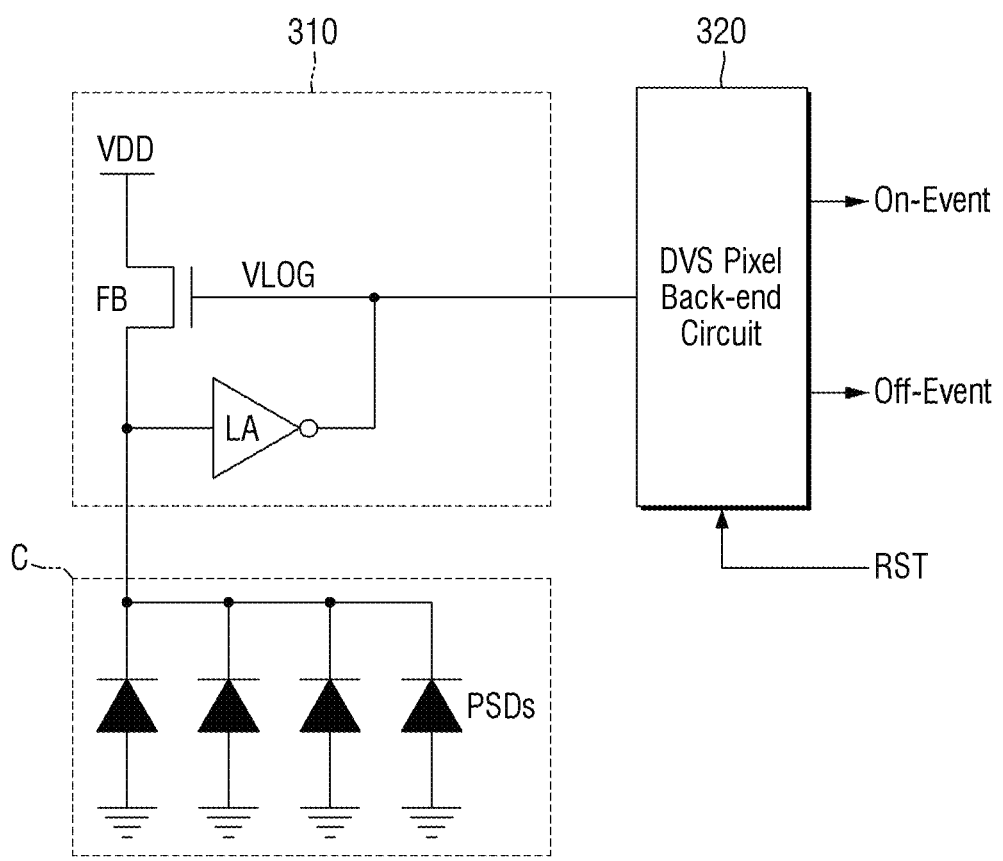
FIG. 5 is a circuit diagram showing an example configuration of the DVS pixel.
Figure 6:
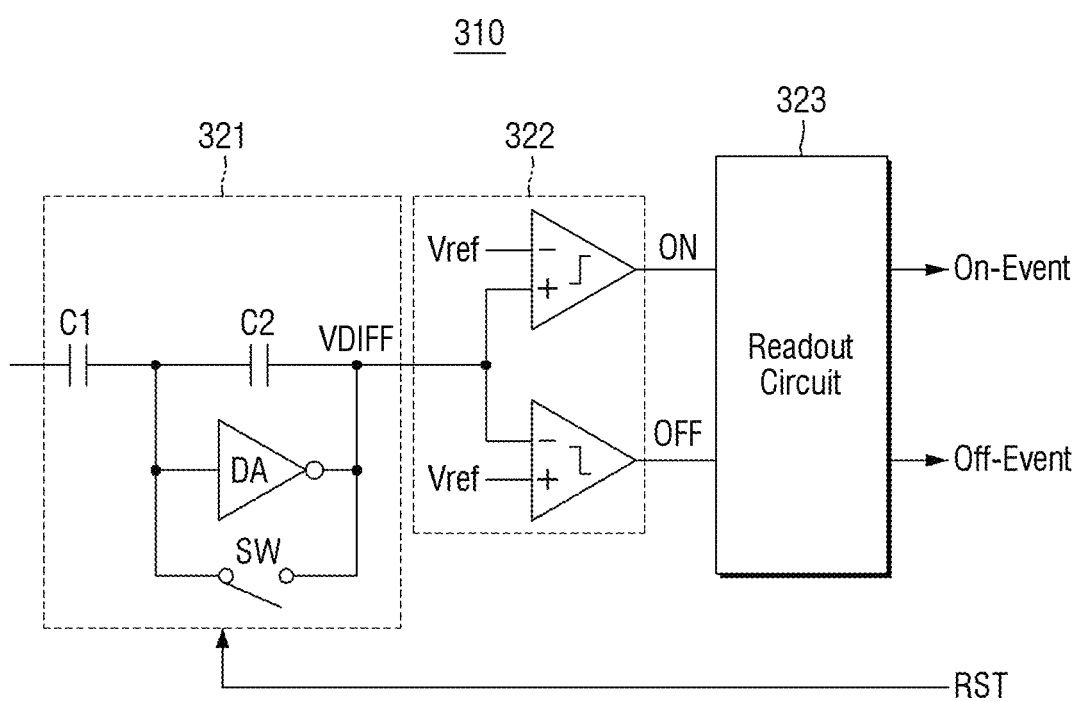
FIG. 6 shows an example configuration of the DVS pixel back-end circuit of FIG. 5.

FIG. 3 is a block diagram illustrating an example configuration of a vision sensor illustrated in FIG. 1. FIG. 4 is a block diagram illustrating an example configuration of a pixel array illustrated in FIG. 2, and FIGS. 5 and 6 are circuit diagrams illustrating an example configuration of a pixel illustrated in FIG. 4.

Referring to FIG. 3, the vision sensor 100 may include a pixel array 111 and an event detection circuit 120. The event detection circuit 120 may be configured to process events in which the light intensity detected by the pixel array 111 increases or decreases. For example, the event detection circuit 120 may include at least one of various components such as address event representation (AER), a sampler, a packetizer, and/or a scanner.

The pixel array 111 may include a plurality of DVS pixels PX arranged in a matrix shape along 'M' number of rows and 'N' number of columns. 'M' may be equal to 'N', may be greater than 'N', or may be less than 'N'. The pixel array 111 may be arranged in a rectangular, e.g. a square array; however, example embodiments are not limited thereto, and the pixel array 111 may be arranged in another pattern such as a hexagonal array. The pixel array 111 may include a plurality of pixels configured to detect events in which the light intensity increases or decreases. For example, each of the pixels may be connected to the event detection circuit 120 through a column line (e.g. a bit line) in a column direction and a row line (e.g. a word line) in a row direction. A signal indicating that an event occurs at a pixel may be transmitted to the event detection circuit 120 through, e.g., the column line. Polarity information of an event that occurs at each pixel (e.g., information indicating whether the event is an on-event in which the light intensity increases or an off-event in which the light intensity decreases) may be transmitted to the event detection circuit 120 through, e.g., the column line.

The event detection circuit 120 may be configured to process the events that occurred. For example, the event detection circuit 120 may generate a timestamp including information on an event occurrence time. For example, the event detection circuit 120 may transmit a reset signal RST to a pixel where an event occurs to reset the pixel.

In some example embodiments, a plurality of event values outputted from all the pixels included in the pixel array 110 may constitute one frame. For example, the frame may include the event values of all the pixels. Alternatively, in some example embodiments, a frame may include a plurality of event values of some pixels, not all the pixels.

In accordance with such example components, the events that occurred in the pixel array 111 may be processed in pixel units, in pixel group units including a plurality of pixels, in column units, and/or in frame units. However, example embodiments only show that the events detected by the pixel array 111 may be processed in various manners, and the technical spirit described throughout is not limited to such components.

Referring to FIG. 4, the pixel array 110 includes a plurality of dynamic vision sensor (DVS) pixels PX arranged in an M×N array (M and N being natural numbers greater than or equal to 1), and detects changes in light intensity and outputs a plurality of event frames.

The pixel array 110 may include a plurality of patches in some example embodiments. A patch C may also be referred to as a cluster, a window, a group, or the like in some example embodiments.

The patch C may include a plurality of DVS pixels. The patch C may be or correspond to a K×L pixel array in some example embodiments, and K and L may be integers greater than or equal to 0 and less than M and N, respectively. Although the patch C is illustrated as being rectangular, example embodiments are not limited thereto. For example, the patch C may have a shape other than a rectangle.

For example, the pixel array 110 may include or be divided into a plurality of patches, and each of the patches may include a plurality of pixels. The event detection circuit 120 may be driven in pixel units in some example embodiments, and/or may be driven in patch units in some example embodiments.

FIG. 5 is a circuit diagram showing an example configuration of the DVS pixel.

Referring to FIG. 5, the DVS pixel 300 includes a photoreceptor 310 and a DVS pixel back-end circuit 320.

The photoreceptor 310 may include a logarithmic amplifier LA and a feedback transistor FB. The photoreceptor 310 may include a photoelectric conversion device PSD in some example embodiment; however, example embodiments are not limited thereto. For example, the photoreceptor 310 may not include a photoelectric conversion device PSD in some example embodiments. The logarithmic amplifier LA amplifies a voltage corresponding to a photocurrent generated by at least one photoelectric conversion device PSD of the pixel. A log voltage VLOG of a log scale may be outputted. The feedback transistor FB may separate the photoreceptor 310 from the DVS pixel back-end circuit 320.

The DVS pixel back-end circuit 320 may perform various processes on the log voltage VLOG. In some example embodiments, the DVS pixel back-end circuit 320 may amplify the log voltage VLOG, may determine whether the intensity of the light incident on the photoelectric conversion device PSD increases or decreases by comparing the amplified voltage with a variable or preset reference voltage, and may output an event signal (i.e., on-event or off-event) corresponding to the determined value. After the DVS pixel back-end circuit 320 outputs an on-event or an off-event, the DVS pixel back-end circuit 320 may be reset by the reset signal RST. The photoelectric conversion elements PSD may be photodiodes; however, example embodiments are not limited thereto. Further the feedback transistor FB may be a single NMOS transistor; however, example embodiments are not limited thereto.

FIG. 6 shows an example configuration of the DVS pixel back-end circuit of FIG. 5. The DVS pixel back-end circuit 320 may include a differentiator 321, a comparator 322, and a read-out circuit 323.

The differentiator 321 may be configured to amplify the voltage VLOG to produce a voltage VDIFF. In some example embodiments, the differentiator 321 may include capacitors C1 and C2, a differential amplifier DA, and a switch SW driven by the reset signal RST. For example, the capacitors C1 and C2 may store electric energy generated by at least one photoelectric conversion device PSD. For example, the capacitances of the capacitors C1 and C2 may be appropriately selected while considering a shortest time (e.g., refractory period) between two events that may occur consecutively in one pixel. A pixel may be initialized when the switch SW is switched on by the reset signal RST. The reset signal RST may be received from the row AER 121 (see, e.g., FIG. 2).

The comparator 322 may compare the levels of the output voltage VDIFF of the differential amplifier DA and a reference voltage Vref to determine whether the event detected in the pixel is an on-event or an off-event. When an event in which a light intensity increases is detected, the comparator 322 may output a signal (ON) indicating the on-event. When an event in which a light intensity decreases is detected, the comparator 322 may output a signal (OFF) indicating the off-event.

The read-out circuit 323 may transmit information on an event that occurs at a pixel. The information on the event outputted from the read-out circuit 323 may be or include information (e.g., bit) on whether the event that occurred is an on-event or an off-event. The information may be referred to as polarity information Pol (see FIG. 3) on the event outputted from the read-out circuit 323. The polarity information may be transmitted to the row AER 121 (see FIG. 2).

Meanwhile, the pixel configuration illustrated in some example embodiments is an example, and some example embodiments is also applied to DVS pixels of various configurations that are configured to detect a change in light intensity and determine a type of an event.

Figure 7:
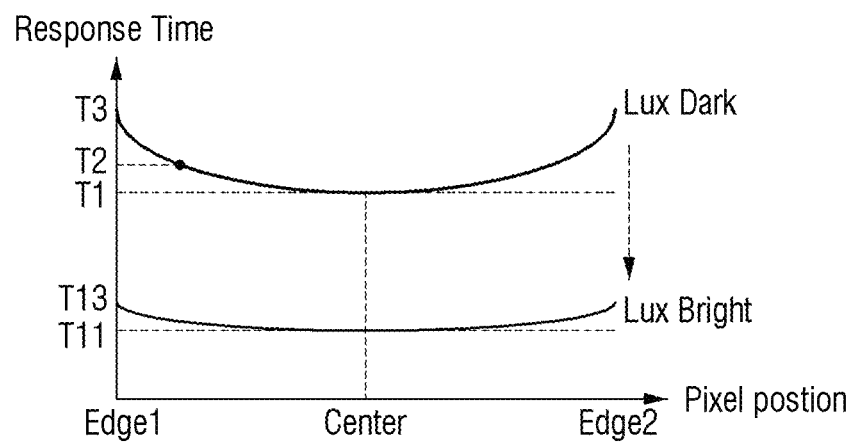
FIG. 7 is a conceptual diagram for explaining lens shading of the pixel array shown in FIG. 2.

FIG. 7 is a conceptual diagram for explaining lens shading of the pixel array shown in FIG. 2.

Referring to FIG. 7, the sensing sensitivity of the vision sensor 100 that is determined by the profile, e.g. the curve of the lens varies depending on the light intensity, e.g., the illuminance. The profile or curve shown in FIG. 7 indicates a timing at which a plurality of event values included in one frame are generated. Although FIG. 7 illustrates a symmetric profile, example embodiments are not limited thereto. For example, a profile of sensing sensitivity of the vision sensor 100 may not be symmetric with respect to the center of the pixel array 110.

A frame may be generated by the event detection circuit 120. In some example embodiments, the frame may include the polarity information Pol of the event, the pixel position AER where the event occurs, and the timestamp of the event occurrence time. In some example embodiments, the frame may be or correspond to or include an event data packet.

In a case of a high illuminance (Lux Bright), the sensing sensitivity is not considerably affected by a pixel position when an event occurs. For example, the difference in the response time (T11-T13) is small between the center of the lens and the edge of the lens. At this time, the response time may be an interval between the event occurrence times at each of a plurality of pixels included in one frame. For example, the response time may be or correspond to a difference in a first event occurrence time between a first time of a first pixel having an earliest event occurrence time in one frame for the first event and a second time of a second pixel different from the first pixel included in the same frame.

However, as the illuminance changes from or is different between the high illuminance to low illuminance (Lux Dark), the sensing sensitivity determined by the profile or curve of the lens, i.e., the lens shading, increases. Specifically, when an event occurs at a low illuminance, a pixel located at the center of the lens is sensed at a time T1, but pixels closer to the edges (Edge1 and Edge2) of the lens require longer response times T2 and T3 to sense occurrence of an event (T1-T3). This is or may be referred to as a lens shading phenomenon.

Therefore, compensation of the lens shading effect while considering the light intensity in the frame, e.g. the illuminance value, and the position of the pixel may be achieved.

Figure 8:
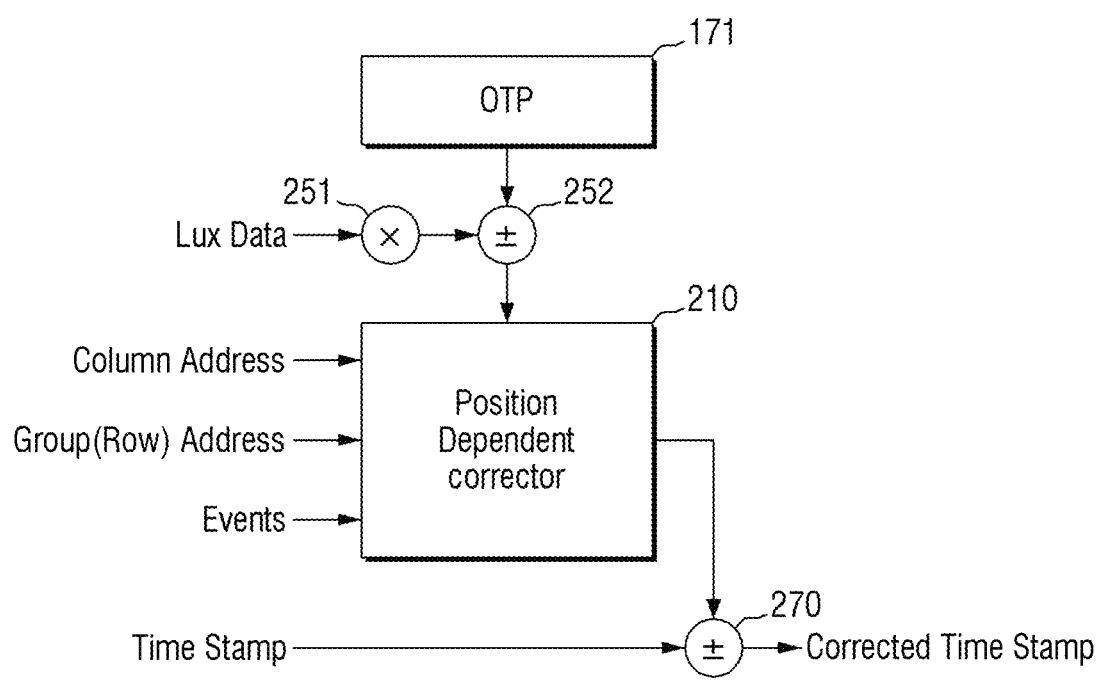
FIG. 8 is a block diagram illustrating the configuration of the event compensation unit shown in FIG. 2.
Figure 9:
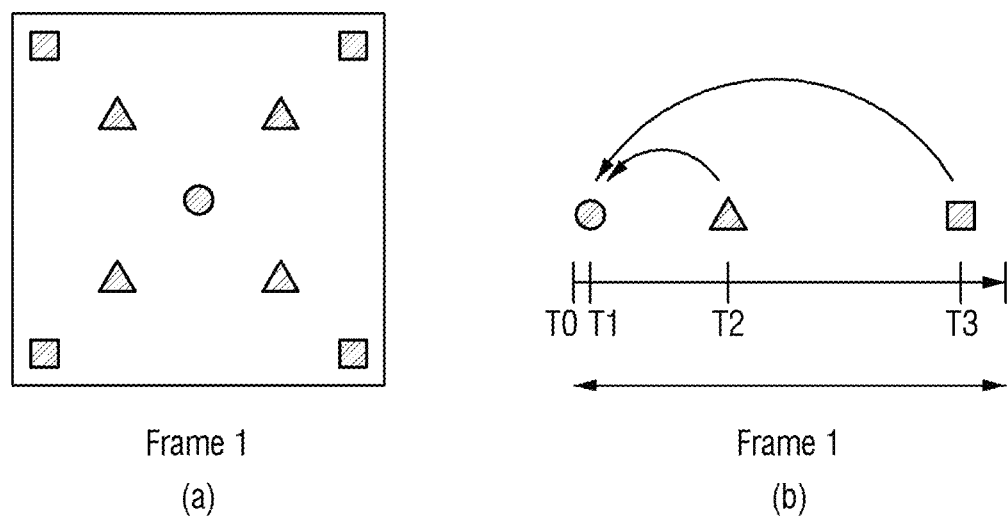
FIG. 9 is a conceptual diagram for explaining the operation of the event compensation unit of FIG. 8.

FIG. 8 is a block diagram illustrating the configuration of the event compensation unit shown in FIG. 2. FIG. 9 is a conceptual diagram for explaining the operation of the event compensation unit of FIG. 8.

Referring to FIG. 8, the event compensation unit 200 may include the multiplier 251, the first adder 252, a position dependent corrector 210, and a second adder 270.

The event compensation unit 200 may correct the second time of the second pixel at which the first event occurs by the difference between the second time of the second pixel and the first time of the first pixel having the earliest first event occurrence time in one frame for the first event.

The memory 170 may store information on the event compensation scheme. In one embodiment, the memory 170 may store the lens shading information.

In some example embodiments, the memory 170 may be or may include the one time programmable (OTP) memory 171. The lens shading information may be information on a response time that considers an illuminance value, a pixel position, a patch position, a lens shape, or the like in some example embodiments. In one example, the response time may include an adjustment time for an event occurrence timing.

The event compensation unit 200 may load the lens shading information from the OTP 171 and reflect the illuminance value L (Lux Data) received from the illuminance detector 130 as a weight. For example, a response time curve shown in FIG. 7 may be selected based on the illuminance value.

Although the scheme is illustrated in which the illuminance value is reflected to the lens shading information includes a multiplier 251 and a first adder 252 in some example embodiments, example embodiments are not limited thereto. For example, alternatively or additionally the scheme may be implemented in various embodiments such as a mapping table and/or the like in some example embodiments.

The position dependent corrector 210 may output at least one adjustment time corresponding to a position of a pixel (e.g. a position as determined by a row address and/or a column address) where an event occurs and an event value based on the lens shading information to which the weight is applied based on the illuminance value. The position of the pixel may be determined based on a center of the pixel array 110 and the row address and/or column address of the pixel, for example according to a Euclidean distance and/or a Manhattan distance; however, example embodiments are not limited thereto.

The second adder 270 may output a corrected timestamp obtained by applying the adjustment time outputted from the position dependent corrector 210 to the timestamp of the time at which the event occurs at the pixel.

Referring to FIG. 9, in Frame 1, the pixels having the same timestamp are indicated by different shapes depending on the response time. The pixel (circle) located at or near the center of the pixel array 110 may be sensed at the response time T1 later than the event occurrence time T0, and the event value may be generated. The pixels (triangle) located at or near the intermediate portions of the pixel array 110 may be sensed at the response time T2 later than the event occurrence time T0, and the event values may be generated. The pixels (squares) located at or near the edges of the pixel array 110 may be sensed at the response time T3 later than the event occurrence time T0, and the event values may be generated. The response time increases in the order of T1, T2, and T3 from the time T0. For example, on the assumption that T0 is 0, the absolute value of the response time T2 may be greater than that of the response time T1, and the absolute value of the response time T3 may be greater than that of the response time T2.

The event compensation unit 200 may adjust the timestamps of T2 and T3 based on the first time T1 that is the earliest response time from the occurrence of the event. For example, a first adjustment time may be applied to advance T2 to T1 and a second adjustment time may be applied to advance T3 to T1. As shown in FIGS. 7 and 8, each of the first adjustment time and the second adjustment time may be outputted from the lens shading information based on the position of the pixel and the illuminance value.

Figure 10:
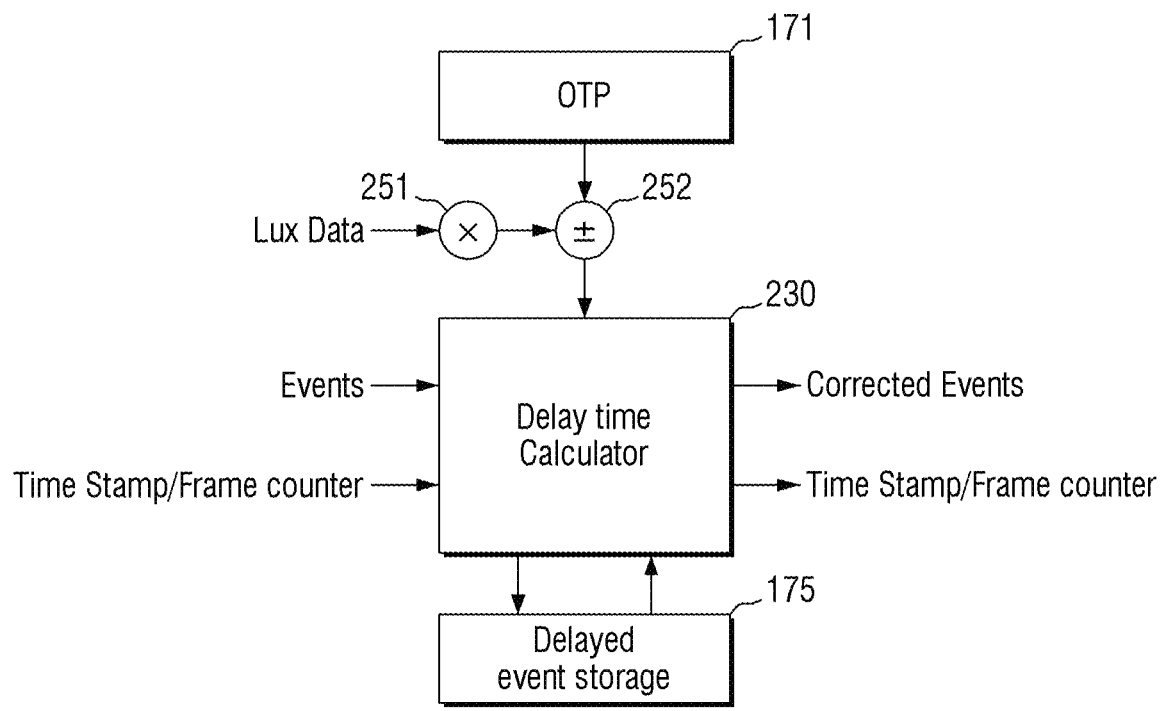
FIG. 10 is a block diagram illustrating the configuration of the event compensation unit shown in FIG. 2.
Figure 11:
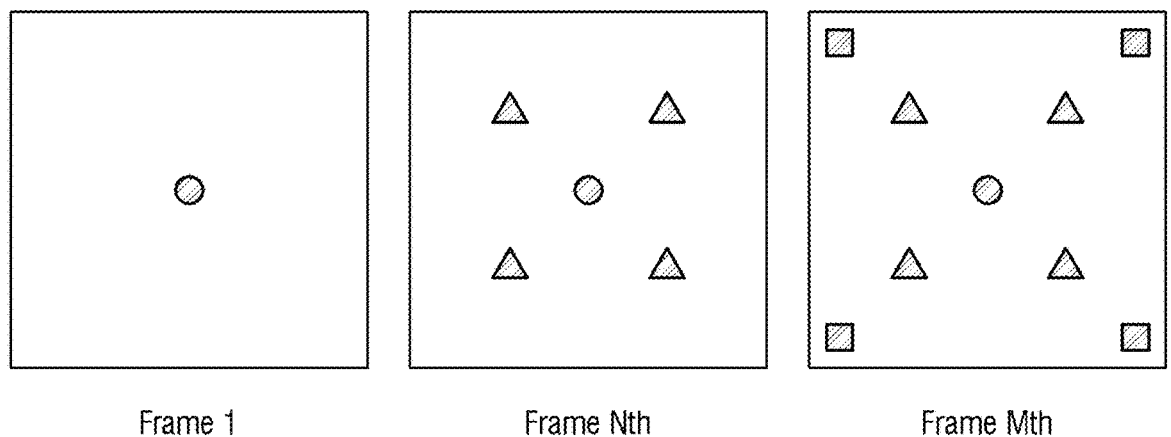
FIG. 11 is a conceptual diagram for explaining the operation of the event compensation unit of FIG. 10.

FIG. 10 is a block diagram illustrating the configuration of the event compensation unit shown in FIG. 2. FIG. 11 is a conceptual diagram for explaining the operation of the event compensation unit of FIG. 10.

Referring back to FIG. 8, the event compensation unit 200 may include the multiplier 251, the first adder 252, and a delay time correction unit 230.

The memory 170 may store information on the event compensation scheme. In some example embodiments, the memory 170 may store the lens shading information and a frame.

In some example embodiments, the memory 170 may include a one-time programmable (OTP) memory 171. The lens shading information may be or include information on a response time that considers an illuminance value, a pixel position, a patch position, a lens shape, and/or the like in some example embodiments. In some example embodiments, the response time may include a delay time for an event occurrence timing.

The event compensation unit 200 may load the lens shading information from the OTP 171 and reflect the illuminance value L (Lux Data) received from the illuminance detector 130 as a weight. For example, a response time curve shown in FIG. 7 may be selected based on the illuminance value. The weight may be or correspond to a number, e.g. a real number, which relates or helps to determine an amount of compensation of events.

Although the scheme is illustrated in which the illuminance value is reflected to the lens shading information and includes a multiplier 251 and a first adder 252 in some example embodiments, example embodiments are not limited thereto. For example, alternatively or additionally the scheme may be implemented with a mapping table and/or the like in some example embodiments.

In some example embodiments, the memory 170 may include a delayed event storage 175 that stores a frame. In some example embodiments, the delayed event storage 175 may store an event value of at least one pixel to be delayed in each of a plurality of frames generated from an earliest response time to a latest response time.

The delay time correction unit 230 may extract at least one delay time corresponding to the position of the pixel based on the lens shading information to which the weight is applied and based on the illuminance value, and may output corrected event data and a corrected frame counter obtained by overlapping a plurality of frames stored in the delayed event storage 175 after the delay time elapses.

Referring now to FIG. 11, when an event occurs at T0, in Frame 1 of the time T1 that is the earliest response time, an event value is generated only at the pixel or pixels (circle) located at or near the center of the pixel array 110. Then, when an event occurs at the time T0, in Frame Nth of the time T2, event values are generated at the pixel located at or near the center of the pixel array 110 and the pixels (triangle) located at or near the intermediate portions between the center and the edges of the pixel array 110. Then, when an event occurs at time T0, in Frame Mth of the time T3, event values are generated at the pixel located at or near the center of the pixel array 110, the pixels located at or near the intermediate portions of the pixel array 110, and the pixels (square) located at or near the edges of the pixel array 110.

For example, the circular event value included in Frame Mth of the time T3 may be a new event value generated at the time T3, and may not be the event value generated at the time T1. Further, the triangular event value included in the Frame Mth of the time T3 may be a new event value generated at the time T3, and may not be the event value generated at the time T2.

For example, in this case, the event values may be distributed and included in a plurality of frames depending on the positions of the pixels for the event that occurred at the time T0. Therefore, the event compensation unit 200 may wait until the event value is generated at the pixel having a longest response time, and then may output all the generated event values in one frame.

For example, the delayed event storage 175 may store the event values (circles and triangles in the illustrated example) delayed in a plurality of frames generated between T1 and T3. When the event values are generated at the square pixel at T3, the delayed event storage 175 may output all the generated event values in one frame of the time T3.

Therefore, the event compensation unit 200 may add a first delay time to the time information corresponding to the circular event value and output the circular event value as corrected time information. The event compensation unit 200 may add a second delay time to the time information corresponding to the triangular event values and output the circular event value as corrected time information. At this time, the time information may be a timestamp in one embodiment, or may be a frame count value in another embodiment. As shown in FIGS. 7 and 10, each of the first delay time and the second delay time may be outputted from the lens shading information based on the position of the pixel and based on the illuminance value. Accordingly, there may be an improvement in or reduction of or elimination of a lens shading effect.

Figure 12:
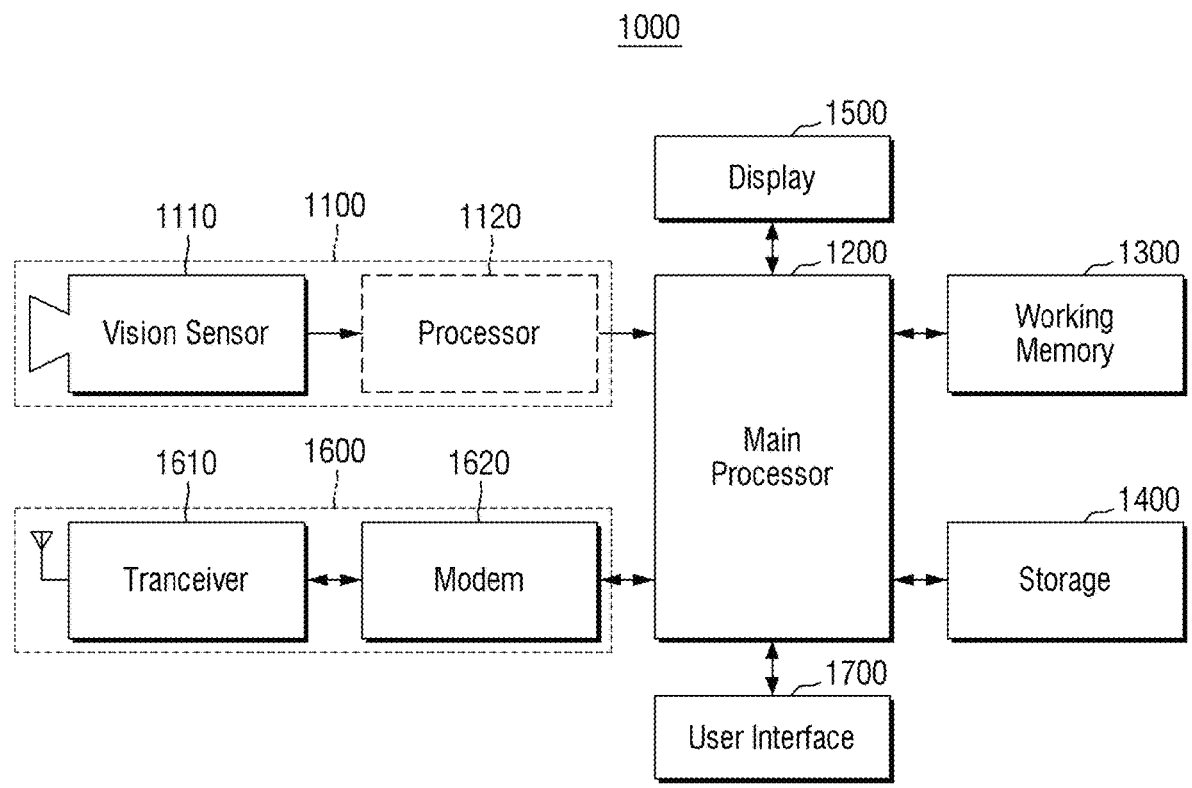
FIG. 12 is a block diagram showing an electronic device to which the image processing device of FIG. 1 is applied

FIG. 12 is a block diagram showing an electronic device to which the image processing device of FIG. 1 is applied.

For example, an electronic device 1000 may be implemented as a smartphone, a tablet computer, a desktop computer, a laptop computer, and a wearable device. Alternatively or additionally, the electronic device 1000 may be implemented as at least one of various electronic devices required to operate an unmanned security system, the Internet of Things, and an autonomous vehicle.

The electronic device 1000 may include an image processing device 1100, a main processor 1200, a working memory 1300, a storage 1400, a display 1500, a communication block 1600, and a user interface 1700.

The image processing device 1100 may be an image processing device implemented to execute the scheme described with reference to FIGS. 1 to 11.

Meanwhile, the event compensation scheme may also be executed as software and/or firmware by the main processor 1200 instead of a processor 1120. Accordingly, the event compensation unit 200 that is firmware or software for realizing a scheme that compensates the event occurrence time by the response time may be loaded on the working memory 1300 and driven by the main processor 1200. Thus, since the event compensation scheme is driven/processed by the main processor 1200, the processor 1120 may be omitted.

The working memory 1300 may store data used for the operation of the electronic device 1000. For example, the working memory 1300 may temporarily store packets or frames processed by the processor 1120. For example, the working memory 1300 may include at least one of a volatile memory such as a dynamic RAM (DRAM), a synchronous RAM (SDRAM) or the like, and/or a nonvolatile memory such as a phase-change RAM (PRAM), a magneto-resistive RAM (MRAM), a ferro-electric RAM (FRAM) or the like.

The storage 1400 may store firmware and software for executing the event compensation scheme. The firmware or the software for executing the event compensation scheme may be read from the storage 1400 in response to a request or a command from the main processor 1200 and loaded on the working memory 1300. The storage 1400 may include a nonvolatile memory such as a flash memory, a PRAM, an MRAM, a ReRAM, a FRAM, or the like.

The display 1500 may include a display panel and a display serial interface (DSI) peripheral circuit. For example, the display panel may be implemented as various devices such as a liquid crystal display (LCD) device, a light emitting diode (LED) display device, an organic LED (OLED) display device, an active matrix OLED (AMO-LED) display device, and the like. A DSI host embedded in the main processor 1200 may perform serial communication with the display panel through a DSI. The DSI peripheral circuit may include a timing controller, a source driver, or the like required to drive the display panel.

The communication block 1600 may exchange a signal with an external device/system through an antenna. A transceiver 1610 and a modulator/demodulator (MODEM) 1620 of the communication block 1600 may process the signal exchanged with the external device/system based on a wireless communication protocol such as at least one of long term evolution (LTE), worldwide interoperability for microwave access (WIMAX), a global system for mobile communication (GSM), code division multiple access (CDMA), Bluetooth, a near field communication (NFC), wireless fidelity (Wi-Fi), radio frequency identification (RFID), or like.

The user interface 1700 may include at least one of input interfaces such as a keyboard, a mouse, a keypad, buttons, a touch panel, a touch screen, a touch pad, a touch ball, a gyroscope sensor, a vibration sensor, an acceleration sensor, and the like.

The components of the electronic device 1000 may exchange data based on one or more of various interface protocols such as at least one of a universal serial bus (USB), small computer system interface (SCIS), peripheral component interconnect express (PCIe), mobile PCIe (M-PCIe), advanced technology attachment (ATA), parallel ATA (PATA), serial ATA (SATA), serial attached SCSI (SAS), integrated drive electronics (IDE), enhanced IDE (EIDE), nonvolatile memory express (NVMe), universal flash storage (UFS), and the like.

Any or all of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

In concluding the detailed description, those of ordinary skill in the art will appreciate that many variations and modifications can be made to some example embodiments without substantially departing from the principles of some example embodiments. Therefore, example embodiments are used in a generic and descriptive sense only and not for purposes of limitation.

What is claimed is:

1. An image processing device comprising:
a vision sensor including a plurality of pixels, each of the plurality of pixels configured to generate a plurality of events per frame by sensing a change in intensity of light, and to generate a plurality of timestamps indicating event occurrence times of the plurality of events; and
a processor configured to correct an event data packet and to output the event data packet, the correcting and the outputting based on a response time determined by a position of the pixel and determined by an illuminance value,
wherein in one frame, the processor is configured to correct a second time of a second pixel at which the event occurs based on a difference between the second time of the second pixel and a first time of a first pixel having an earliest event occurrence time.

2. The image processing device of claim 1, wherein in one frame, the response time corresponds to an interval between the event occurrence times at each of the plurality of pixels.

3. The image processing device of claim 1, wherein the processor is configured to select at least one adjustment time corresponding to an event value and a position of the pixel where the event occurs, the selecting from a map table to which a weight is applied, the weight based on the illuminance value.

4. The image processing device of claim 3, wherein the processor is configured to output a corrected timestamp obtained by applying the selected at least one adjustment time to a timestamp of the event occurrence time.

5. The image processing device of claim 1, wherein the processor is configured to correct each pixel in a plurality of frames generated between a first time having an earliest response time and a third time having a latest response time, the correcting overlapping the frame generated at the third time.

6. The image processing device of claim 5, wherein the processor is configured to select at least one delay time corresponding to a frame counter value of the event occurrence time and an event value from a map table to which a weight is applied, the weight based on the illuminance value.

7. The image processing device of claim 6, wherein the processor is configured to apply the selected at least one delay time to a frame counter of each event generated from the earliest first time to the third time, and to simultaneously output all events generated from the first time to the third time to the applied frame counter.

8. The image processing device of claim 1, wherein the position of the pixel is determined by a distance of the pixel to a center of the plurality of pixels.

9. The image processing device of claim 8, wherein the distance is based on at least one of a Manhattan distance or a Euclidean distance.

10. An image processing device comprising:
a pixel array including a plurality of pixels, each of the plurality of pixels configured to sense a change in light intensity and to generate an event performed by a moving object;
processing circuitry configured to output the change in light intensity sensed from the pixel array as an illuminance value,
to enable at least one pixel of the pixel array,
to receive an event value from the pixel when the event occurs,
to issue a timestamp at a preset period, and
to correct an event data packet based on a response time determined by an illuminance value and by an address of the pixel where the event occurs; and
a memory configured to store lens shading information including a response time determined by a position of the pixel and by the illuminance value.

11. The image processing device of claim 10, wherein the response time corresponds to an interval between the event occurrence times at each of the plurality of pixels in one frame, and
the frame includes values of each pixel included in the pixel array.

12. The image processing device of claim 10, wherein the processing circuitry is configured to correct a second time of a second pixel at which the event occurs by a difference between the second time of the second pixel and a first time of a first pixel having an earliest event occurrence time in one frame.

13. The image processing device of claim 12, wherein the processing circuitry is configured to output at least one adjustment time corresponding to an event value and a position of the pixel where the event occurs, the event value based on the lens shading information to which a weight is applied, the weight based on the illuminance value.

14. The image processing device of claim 13, wherein the processing circuitry is configured to output a corrected timestamp by applying the adjustment time to a timestamp of the event occurrence time.

15. The image processing device of claim 9, wherein the processing circuitry is configured to correct each pixel in a plurality of frames generated between a first time having an earliest response time and a third time having a latest response time, the correcting overlapping the frame generated at the third time.

16. The image processing device of claim 15, wherein the processing circuitry is configured to store each of a plurality of frames generated between the first time and the third time.

17. The image processing device of claim 16, wherein the processing circuitry is configured to extract at least one delay time corresponding to the position of the pixel, the position based on the lens shading information to which a weight is applied, the weight based on the illuminance value, and to output corrected event data and a corrected frame counter, the corrected event data and the corrected frame counter obtained by overlapping a plurality of frames stored in a delayed event storage after the delay time elapses.

18. An operating method of an image processing device, comprising:
generating an event in at least one pixel included in a pixel array, the event based on movement of an object;
correcting an event occurrence time when the event occurs based on lens shading information corresponding to a pixel position in the pixel array where the event occurs and based on an illuminance value of the event occurrence time; and
outputting a plurality of event values as an event data packet, the outputting based on the corrected time.

19. The operating method of claim 18, wherein the correcting comprises:
extracting a response time determined by the pixel position from the lens shading information;
reflecting the illuminance value as a weight in the extracted response time to obtain a weighted response time; and
applying, in one frame, the weighted response time to a timestamp at which an event occurs in each pixel.

20. The operating method of claim 19, wherein the corrected time is obtained by applying the response time to remaining timestamps of remaining pixels based on a first time of a first pixel having an earliest event occurrence time in the one frame.

* * * * *